H. JOHANNESEN.
APPARATUS FOR MAKING LEGGINGS.
APPLICATION FILED JAN. 26, 1917.
1,229,277.
Patented June 12, 1917.
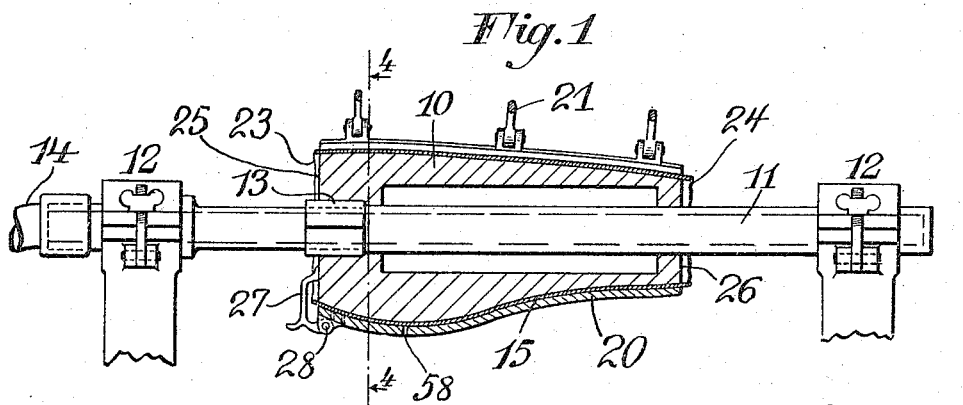
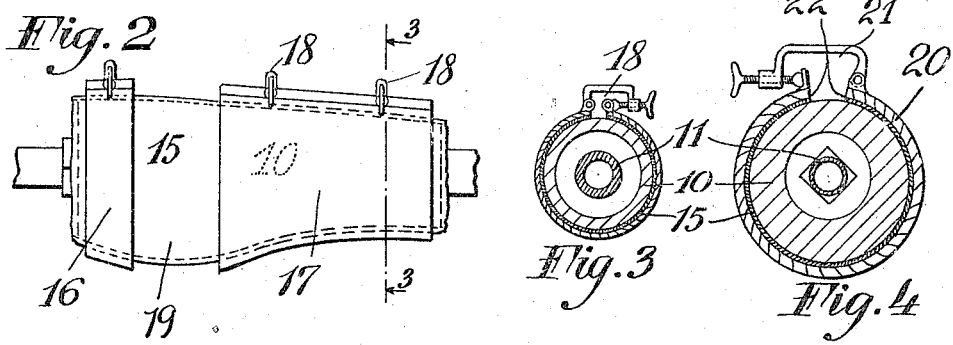
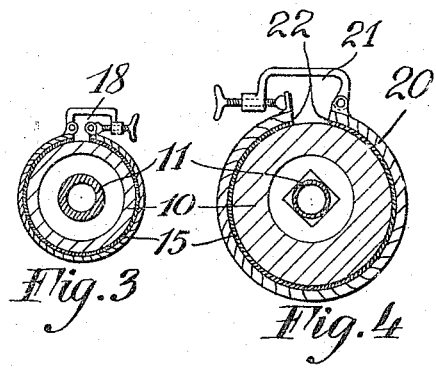
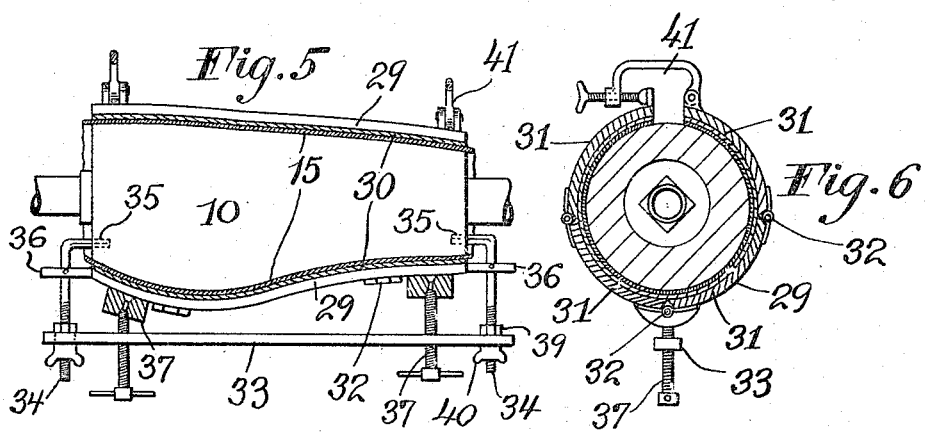
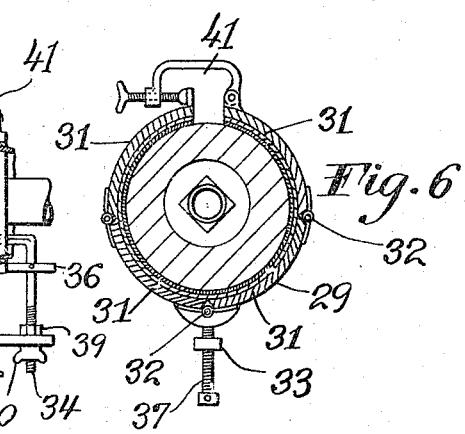
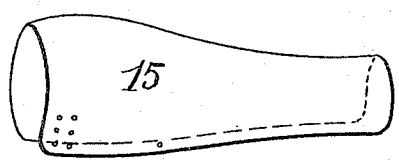
Helge Johannesen
Inventor
By his Attorney
Ivan E. C. Konigsberg

UNITED STATES PATENT OFFICE.

HELGE JOHANNESEN, OF BROOKLYN, NEW YORK.

APPARATUS FOR MAKING LEGGINGS.

1,229,277.  Specification of Letters Patent.  Patented June 12, 1917.

Application filed January 26, 1917. Serial No. 144,593.

*To all whom it may concern:*

Be it known that I, HELGE JOHANNESEN, a citizen of the Norwegian Monarchy, and resident of Brooklyn, in the county of Kings and State of New York, have invented certain new and useful Improvements in Apparatus for Making Leggings, of which the following is a specification.

This invention relates to improvements in apparatus for molding or pressing leggings of leather, or other similar articles made of the same or similar material.

The object of the invention is to devise an improved apparatus for making leggings or like article with a view of producing a more finished and better article than it is possible to obtain with the present apparatus for manufacture. Another object is to provide an apparatus adapted for manufacturing in large quantities so as to increase the output, while decreasing the cost. With these and other objects in view, the invention comprises a method described and as illustrated in the accompanying drawing in which—

Figure 1 is a sectional view of an apparatus embodying my invention;

Fig. 2 is a view in elevation illustrating the operation of the apparatus;

Fig. 3 is a sectional view taken on line 3—3 of Fig. 2;

Fig. 4 is a sectional view taken on line 4—4 of Fig. 1;

Fig. 5 illustrates a modified apparatus;

Fig. 6 is a sectional view of the apparatus shown in Fig. 5; and

Fig. 7 illustrates a legging made according to my invention.

In carrying out my invention I employ a form 10 of cast iron or other suitable material and which is shaped according to the shape of the finished legging. In order to handle the form in a convenient manner I mount it on a shaft 11 which may be clamped fast in suitable bearings 12, 12 which latter may be parts of a general base or framework not shown. Preferably the shaft is provided with a squared portion 13 which fits into a corresponding square socket in the form to prevent the latter from turning except with the shaft. The shaft 11 may be hollow as shown for the admission of steam or hot water supplied by a hose 14.

The legging is cut from a piece of leather in the required dimensions and shape and is first dipped in hot water to soften it so it may be shaped. The piece of leather is thereafter laid upon the form 10 and is shaped on said form by means of two, or more, shaping members 16 and 17. Each of the latter forms a portion of a finished legging and is preferably made of a thicker leather than the piece 15. Each shaping member is shaped according to the corresponding portion of the legging which is to be shaped thereby. The shaping members are clamped tightly by suitable clamping means 18.

I have found it to be very difficult, if not altogether impossible, to shape a legging properly by pressing the leather between the form 10 and a complete outer form or shaping member. A perfect result is obtained by shaping the legging by the members 16 and 17 which permit a gradual shaping without wrinkling or folding. This operation is done for the purpose of preshaping certain portions of the legging so as to avoid unevenness and wrinkling when the final molding takes place. When the leather 15 is first put on it is advantageous to have the "calf" portion 19 of the form 10 uppermost, after which the shaft 11 and form 10 are rotated for convenience in operating the clamps 18. I have found that the legging is shaped very quickly and smoothly by the shaping members 16 and 17, which eliminate manual stretching or shaping.

I may then proceed to form several leggings in this manner and then return and open the clamps 18 as soon as the legging has "set" on the first form.

Thereafter the shaping members are removed and a molding member 20 of heavy sole leather or like material is put on over the legging and clamped on by means of clamps 21. The molding member 20 prevents warping of the legging until it is fully dried and set, after which the legging 15 is cut to its final shape by cutting along the edges 22, 22 of the molding member 20. The latter is therefore of the proper form and is as a matter of fact a finished legging of heavy material. The legging 15 is trimmed off at the ends 23 and 24 even with the end surfaces of the form 15 and the ends of the molding members 20, for which purpose the latter is registered exactly with the surfaces 25 and 26 of the form 10. Inasmuch as the overhanging ends 23 and 24 of the legging makes sighting impossible, there is provided a registering member 27 pivoted at 28 to the molding member or form legging 20.

The hinge 28 is a spring hinge whereby the registering member may be held in registering position as shown or swung away from the form. Before clamping the clamps 21 the form legging 20 is moved longitudinally till the member 27 strikes the surface 25 and the form 20 will thus be registered on the form. After the legging is dry, the member 27 is moved out of registry and the legging cut in its final form. Holes as at 58 may be used for marking the holes for the straps to be sewed onto the legging.

In Fig. 5 the legging 15 is first formed as illustrated in Fig. 2. Thereafter a finished legging 30 is put on as a lining and finally an iron jacket or mold 29 is clamped around the two leggings until the legging 15 is dry and set. The iron mold is made in sections 31, 31, 31 hinged together at 32. When it is put on, the calf portion 19 of the mold is uppermost. A brace 33 is placed in position as shown by means of two registering members 34, 34, which have square ends 35, 35 entering square sockets in the form 15. The members 34 carry collars 36, 36 between which the iron jacket 29 is registered even with the form 15. Thereafter the clamps 37, 37 are screwed down. The brace 33 is carried on the registering members by means of nuts and wing bolts 39 and 40. The form is then rotated to the position shown, the iron jacket closed up and clamped by clamps as 41, after which the brace 33, clamps 37 and registering members 34, are removed, and may be used on another form 10. The legging is then dried and cut.

The form 10 with the parts on it as illustrated in Fig. 5 may be taken off the shaft 11 and left to stand while the next leggings are similarly treated.

I have found that leggings produced with the apparatus as herein described and shown are perfectly smooth and keep the shape, also that the work can be carried on very rapidly. The details of the apparatus and other changes in the invention may of course be made without departing from the principle thereof. It is also obvious that the invention is not limited to the making of leggings.

I claim:

1. A device for making leggings comprising a form, a plurality of shaping members for shaping certain portions of the legging on said form, means for clamping said members to said form, a molding member, means for registering the latter on said form and means for clamping it thereto after the said shaping members have been removed.

2. A device for making leggings comprising a form, means for rotatably supporting the same, a plurality of shaping members, means for clamping the same on said form to pre-shape the legging thereon, a molding member of the shape of a finished legging and means for clamping said molding member to the said form to finish the shaping of the legging.

3. A device for making leggings comprising a form, means for rotatably supporting the same, a plurality of shaping members, means for clamping the same on said form to pre-shape the legging thereon, a molding member of the shape of a finished legging, means for registering said molding member on said form and means for clamping said member thereto.

4. A device for molding leggings comprising a form, means for shaping the leggings on the same, a lining adapted to be placed over the shaped legging after said means have been removed, a molding member shaped to fit said lining when the latter is over the legging comprising a plurality of sections hinged together, and means for clamping said molding member in position.

5. A device for molding leggings comprising a form, means for shaping the leggings on the same, a lining adapted to be placed over the shaped legging after said means have been removed, a molding member shaped to fit said lining when the latter is over the legging comprising a plurality of sections hinged together, means for clamping said molding member in position and means for registering said molding member with the said form.

Signed at New York in the county of New York and State of New York this 23rd day of Jan. A. D. 1917.

HELGE JOHANNESEN.